(12) United States Patent
Kim

(10) Patent No.: US 12,344,692 B2
(45) Date of Patent: Jul. 1, 2025

(54) BLOCK COPOLYMER, METHOD FOR PREPARING THE SAME, AND ASPHALT COMPOSITION COMPRISING THE SAME

(71) Applicant: LG CHEM, LTD., Seoul (KR)

(72) Inventor: Tae Jung Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 785 days.

(21) Appl. No.: 17/629,453

(22) PCT Filed: Jun. 3, 2021

(86) PCT No.: PCT/KR2021/006908
§ 371 (c)(1),
(2) Date: Jan. 24, 2022

(87) PCT Pub. No.: WO2021/246794
PCT Pub. Date: Dec. 9, 2021

(65) Prior Publication Data
US 2022/0235166 A1    Jul. 28, 2022

(30) Foreign Application Priority Data
Jun. 4, 2020  (KR) .......................... 10-2020-0067391

(51) Int. Cl.
C08F 293/00   (2006.01)
C08L 95/00    (2006.01)

(52) U.S. Cl.
CPC ............ *C08F 293/00* (2013.01); *C08L 95/00* (2013.01)

(58) Field of Classification Search
CPC ............................. C08F 293/00; C08L 95/00
See application file for complete search history.

(56) References Cited

U.S. PATENT DOCUMENTS

| | | | |
|---|---|---|---|
| 3,663,659 A | 5/1972 | Kray et al. | |
| 5,242,989 A | 9/1993 | Bening et al. | |
| 5,356,975 A | 10/1994 | Bening et al. | |
| 6,696,523 B1 | 2/2004 | Scholl et al. | |
| 2004/0068036 A1 | 4/2004 | Halladay et al. | |
| 2012/0245295 A1 | 9/2012 | Lee et al. | |
| 2015/0368455 A1* | 12/2015 | Akahori | C08L 23/12 525/89 |
| 2017/0327601 A1 | 11/2017 | Kato et al. | |
| 2019/0077962 A1 | 3/2019 | Kim et al. | |
| 2020/0165441 A1 | 5/2020 | Lee et al. | |

FOREIGN PATENT DOCUMENTS

| | | |
|---|---|---|
| CN | 1077459 A | 10/1993 |
| CN | 102597032 A | 7/2012 |
| CN | 106700578 A | 5/2017 |
| CN | 111032717 A | 4/2020 |
| JP | H06-025324 A | 2/1994 |
| JP | 3285653 B2 | 5/2002 |
| JP | 2003-261636 A | 9/2003 |
| JP | 3668773 B2 | 7/2005 |
| JP | 2010-150555 A | 7/2010 |
| JP | 2016-210647 A | 12/2016 |
| JP | 2018-534372 A | 11/2018 |
| KR | 10-2002-0010635 A | 2/2002 |
| KR | 10-2005-0111804 A | 11/2005 |
| KR | 10-0711270 B1 | 4/2007 |
| KR | 10-1051880 B1 | 7/2011 |
| KR | 10-2013-0030424 A | 3/2013 |
| KR | 10-2015-0088769 A | 8/2015 |
| KR | 10-2020-0061905 A | 6/2020 |
| WO | 2004-033573 A1 | 4/2004 |
| WO | 2016/098760 A1 | 6/2016 |

OTHER PUBLICATIONS

Yadav et al., "A concise stereoselective total synthesis of (+)-artemisinin," Tetrahedron, 66 (11): 2005-2009 (2010).
Yamaguchi et al., "Asymmetric Hydroboration of Diene Polymers," Polymer Journal, 3 (1): 12-20 (1972).
International Search Report issued in corresponding International Patent Application No. PCT/KR2021/006908 dated Sep. 15, 2021.
Supplementary European Search Report for related European Application No. EP 21 81 8348 dated Jul. 21, 2022, 6 pages.
Office Action for related Chinese Application No. 202180004820.6 dated Sep. 5, 2022, 6 pages.
Office Action issued in corresponding Japanese Patent Application No. 2022-511344, dated Jan. 12, 2023.

* cited by examiner

*Primary Examiner* — Ling Siu Choi
*Assistant Examiner* — Andrea Wu
(74) *Attorney, Agent, or Firm* — Morgan, Lewis & Bockius LLP

(57) ABSTRACT

Disclosed is a block copolymer including an aromatic vinyl-based polymer block, a conjugated diene-based polymer block and a coupling agent linking group, wherein the conjugated diene-based polymer block includes a hydroxyl group, and the hydroxyl group content is 0.5 mol % to 12.0 mol % based on the double bond content of a conjugated diene-based monomer unit, a method for preparing the same, and an asphalt composition including the same.

11 Claims, No Drawings

US 12,344,692 B2

BLOCK COPOLYMER, METHOD FOR PREPARING THE SAME, AND ASPHALT COMPOSITION COMPRISING THE SAME

CROSS-REFERENCE TO RELATED APPLICATIONS

The present application claims the benefit of priority based on Korean Patent Application No. 10-2020-0067391, filed on Jun. 4, 2020, the entire contents of which are incorporated herein by reference.

TECHNICAL FIELD

The present invention relates to a block copolymer, and to a block copolymer including a hydroxyl group, having excellent physical properties at a high temperature and compatibility with asphalt, and used as an asphalt modifier, a method for preparing the same, and an asphalt composition including the same.

BACKGROUND ART

Asphalt is a residue after vaporizing most volatile components from the components of petroleum crude oil, and maintains a liquid or semi-solid state having a high viscosity at a high temperature, but has physical properties of stiffly hardening at a temperature of room temperature or less. In addition, since asphalt has rich plasticity, high water resistance, electric insulating properties and adhesiveness, and has chemically stable properties, the asphalt is widely applied as a material for paving a road and a building material such as a waterproof material. However, in the case where such asphalt is exposed at a high temperature for a long time during using, there are problems in that plastic deformation may be generated, and cracks may be generated by an external impact at a low temperature.

In order to solve such problems, recently, research on improving the physical properties of asphalt by adding various polymers has been conducted. For example, there is a method of using an aromatic vinyl hydrocarbon-conjugated diene block copolymer such as styrene-butadiene-styrene (SBS) block copolymer as a modifier or an impact reinforcing agent for improving the physical properties of an asphalt composition.

Generally, in order to use an SBS block copolymer in an asphalt composition, compatibility with asphalt is most basically and essentially required. If the SBS block copolymer has excellent compatibility with the asphalt, a processing time may be reduced, and improving effects of the physical properties of the asphalt are also great.

However, due to the recent increase of crude oil prices and energy-saving policy, the content of asphaltene which is the by-product in asphalt which is a refinery residue is increasing according to consistent upgrade of oil-refining facility. The asphaltene is an aggregate of aromatic hydrocarbons and includes lots of polar functional groups at the terminals thereof, and thus, has very low compatibility with an SBS block copolymer which has no polar functional groups. Accordingly, the quality deterioration of asphalt is induced, including the large increase of the processing time of an asphalt composition, and the deterioration of the elasticity of a modified asphalt composition.

In order to solve such problems, a method of changing the molecular microstructure of the block copolymer, a method of injecting an additive such as an oil as a processing auxiliary, or the like has been suggested to control the molecular weight of the SBS block copolymer or supplementing coupling effects, but individual prescriptions for each asphalt having diverse quality deviations are required, and the ultimate solution was not obtained.

Accordingly, the development of an SBS block copolymer as an asphalt modifier having excellent compatibility with asphalt is urgent.

PRIOR ART DOCUMENT

Patent Document (Patent Document 1) KR0711270B1

DISCLOSURE OF THE INVENTION

Technical Problem

The present invention has been made to solve the above-described problems of the conventional technique, and has an object to provide a block copolymer having excellent compatibility with asphalt and excellent physical properties at a high temperature, and possibly used as an asphalt modifier.

In addition, another object of the present invention is to provide a method for preparing a block copolymer, by which hydroxyl groups may be introduced into a block copolymer for preparing the block copolymer.

In addition, another object of the present invention is to provide an asphalt composition having excellent compatibility with a block copolymer, a short dissolution time of the block copolymer, and excellent physical properties at a high temperature, by including the block copolymer as an asphalt modifier.

Technical Solution

In order to solve the above-described tasks, the present invention provides a block copolymer comprising an aromatic vinyl-based polymer block, a conjugated diene-based polymer block and a coupling agent linking group, wherein the conjugated diene-based polymer block comprises a hydroxyl group, and the hydroxyl group content is 0.5 mol % to 12.0 mol % based on the double bond content of a conjugated diene-based monomer unit.

In addition, the present invention provides a method for preparing a block copolymer, comprising: injecting an aromatic vinyl-based monomer and polymerizing in the presence of an organolithium compound to prepare an anionic active aromatic vinyl-based polymer (S10); injecting a conjugated diene-based monomer and polymerizing in the presence of the anionic active aromatic vinyl-based polymer prepared in step (S10) to prepare an anionic active diblock copolymer (S20); injecting a coupling agent and reacting in the presence of the anionic active diblock copolymer prepared in step (S20) to prepare a triblock copolymer (S30); and performing a hydroboration and an oxidation reaction in the presence of the triblock copolymer prepared in step (S30) to prepare a block copolymer (S40), wherein a conjugated diene-based polymer block of the block copolymer prepared in step (S40) comprises a hydroxyl group, and the hydroxyl group content is 0.5 mol % to 12.0 mol % based on the double bond content of a conjugated diene-based monomer unit.

In addition, the present invention provides an asphalt composition comprising the block copolymer and asphalt.

Advantageous Effects

If the block copolymer of the present invention is used as an asphalt modifier, compatibility with asphalt may be excellent, and excellent effects of physical properties at a high temperature may be shown.

In addition, according to the method for preparing a block copolymer of the present invention, effects of introducing hydroxyl groups into a block copolymer to a desired level may be achieved.

In addition, by including the block copolymer as an asphalt modifier, the asphalt composition of the present invention has excellent compatibility with the block copolymer, a short dissolution time with the block copolymer, and effects of excellent physical properties at a high temperature.

BEST MODE FOR CARRYING OUT THE INVENTION

Hereinafter, the present invention will be described in more detail to assist the understanding of the present invention.

It will be understood that words or terms used in the description and claims of the present invention shall not be interpreted as the meaning defined in commonly used dictionaries. It will be understood that the words or terms should be interpreted as having a meaning that is consistent with their meaning in the technical idea of the invention, based on the principle that an inventor may properly define the meaning of the words to best explain the invention.

The term "monomer unit" in the present invention may represent a component or a structure derived from a monomer or the material itself, in a particular embodiment, may mean a repeating unit formed in a polymer through the participation of the monomer injected in polymerization reaction during polymerizing the polymer.

The term "polymer" used in the present invention may mean a homopolymer formed by polymerizing one type of a monomer.

The term "block" used in the present invention may mean a repeating unit group composed of only the repeating unit derived from the same monomer through the participation of the same monomer in polymerization reaction, in a copolymer, and in a particular embodiment, an aromatic vinyl-based polymer block may mean a block formed from only an aromatic vinyl monomer unit, and a conjugated diene-based polymer block may mean a block formed from only a conjugated diene-based monomer unit.

The term "coupling agent linking group" used in the present invention may mean the remainder part of a coupling agent which is a part of a block copolymer and formed through the coupling of polymer blocks by the coupling agent.

The term "anionic active polymer" used in the present invention may mean a polymer formed by anionic polymerization reaction, and may mean a polymer of which one terminal maintains an anionic state so as to undergo additional polymerization or reaction, in a particular embodiment, may mean a living anionic polymer.

The term "composition" used in the present invention includes a mixture of materials including the corresponding composition as well as a reaction product and a decomposition product formed from the materials of the corresponding composition.

The present invention provides a block copolymer which may be used as an asphalt modifier.

Conventionally, in case of applying a block copolymer as an asphalt modifier, as methods for improving compatibility with respect to asphalt, methods for improving the solubility of a block copolymer with respect to asphalt by using a coupling agent including a polar group have been suggested. However, since the polar group is introduced as a coupling agent in such methods, the number of polar groups introduced into the block copolymer is dependent on the coupling agent, and the number of the polar groups are insufficient, and accordingly, there are problems of showing insufficient effects.

Accordingly, the present invention provides a block copolymer used as an asphalt modifier, wherein the block copolymer has excellent compatibility with asphalt and excellent physical properties at a high temperature, and may be used as an asphalt modifier by directly introducing hydroxyl groups which are polar groups in a block copolymer.

According to an embodiment of the present invention, the block copolymer may be a block copolymer including an aromatic vinyl-based polymer block, a conjugated diene-based polymer block and a coupling agent linking group, wherein the conjugated diene-based polymer block includes a hydroxyl group, and the hydroxyl group content is 0.5 mol % to 12.0 mol % with respect to the double bond content of a conjugated diene-based monomer unit.

According to an embodiment of the present invention, the aromatic vinyl-based polymer block may be a block formed by the polymerization of an aromatic vinyl-based monomer, and the aromatic vinyl-based monomer for forming the aromatic vinyl-based polymer block may be one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene and 1-vinyl-5-hexylnaphthalene, and a particular example may be styrene.

According to an embodiment of the present invention, the amount of the aromatic vinyl-based polymer block may be 5 wt % to 50 wt %, 10 wt % to 40 wt %, or 20 wt % to 40 wt % based on the total amount of the block copolymer, and within this range, effects of preventing the deterioration of the softening point and viscosity of the block copolymer may be obtained.

According to an embodiment of the present invention, the conjugated diene-based polymer block may be a block formed by the polymerization of a conjugated diene-based monomer, and the conjugated diene-based monomer for forming the conjugated diene-based polymer block may be one or more selected from the group consisting of 1,3-butadiene, 2,3-dimethyl-1,3-butadiene, piperylene, 3-butyl-1,3-octadiene, isoprene, 2-phenyl-1,3-butadiene and 2-halo-1,3-butadiene (halo means a halogen atom), and a particular embodiment may be 1,3-butadiene.

According to an embodiment of the present invention, the amount of the conjugated diene-based polymer block may be 50 wt % to 95 wt %, 60 wt % to 90 wt %, or 60 wt % to 80 wt % based on the total amount of the block copolymer, and within this range, excellent effects of the mechanical properties of an asphalt composition including the block copolymer as an asphalt modifier may be obtained.

According to an embodiment of the present invention, the coupling agent linking group may be a linking group formed by the coupling reaction of a diblock copolymer and the coupling agent, and the coupling agent for forming the coupling agent linking group is a polyfunctional coupling agent and may be one or more selected from the group consisting of a vinyl group-containing hydrocarbon-based compound such as divinylbenzene; an ester-based compound such as diethyl adipate and glycidyl methacrylate; a silane-based compound such as dimethyldichlorosilane, methyldichlorosilane, methoxysilane, glycidoxy trimethoxysilane, and oxydipropyl bis(trimethoxysilane; a polysiloxane-based compound such as α,ω-bis(2-trichlorosilyl-ethyl)polydimethylsiloxane; and a polyketone.

According to an embodiment of the present invention, the block copolymer includes hydroxyl groups in the conjugated diene-based polymer block, and the hydroxyl groups which are polar groups are directly introduced into the block copolymer, thereby showing excellent compatibility with asphalt and effects of excellent physical properties at a high temperature.

According to an embodiment of the present invention, the hydroxyl group content may be 0.5 mol % to 12.0 mol %, 1.0 mol % to 10.0 mol %, 1.0 mol % to 8.0 mol %, 1.0 mol % to 5.0 mol %, 1.5 mol % to 4.0 mol %, 1.5 mol % to 3.0 mol % or 1.5 mol % to 2.5 mol % based on the double bond content of the conjugated diene-based monomer unit. Here, the double bond content of the conjugated diene-based monomer unit may mean the total content of all double bonds included in a vinyl bond unit formed by 1,2-addition reaction and cis and trans bond units formed by 1,4-addition reaction, based on a 1,3-butadiene monomer during polymerizing the conjugated diene-based monomer. In addition, since the hydroxyl groups are introduced as an added type into the double bond of the conjugated diene-based monomer unit, the hydroxyl group content may be derived from the double bond content of the conjugated diene-based monomer unit. If the hydroxyl group content is less than 0.5 mol %, the hydroxyl groups which are the polar groups may be insufficiently introduced into the block copolymer, and there are problems of insufficiently improving the solubility with respect to asphalt. In addition, if the hydroxyl group content is greater than 12.0 mol %, the hydroxyl groups which are the polar groups may be present in an excessive amount in the block copolymer, and the solubility with respect to asphalt may be improved, but the viscosity of an asphalt composition may also increase due to such polar groups, thereby serving a factor of deteriorating processability.

In order to prepare the block copolymer, the present invention provides a method for preparing a block copolymer for introducing hydroxyl groups into a block copolymer.

According to an embodiment of the present invention, the method for preparing a block copolymer includes: injecting an aromatic vinyl-based monomer and polymerizing in the presence of an organolithium compound to prepare an anionic active aromatic vinyl-based polymer (S10); injecting a conjugated diene-based monomer and polymerizing in the presence of the anionic active aromatic vinyl-based polymer prepared in step (S10) to prepare an anionic active diblock copolymer (S20); injecting a coupling agent and reacting in the presence of the anionic active diblock copolymer prepared in step (S20) to prepare a triblock copolymer (S30); and performing a hydroboration and an oxidation reaction in the presence of the triblock copolymer prepared in step (S30) to prepare a block copolymer (S40), wherein the conjugated diene-based polymer block of the block copolymer prepared in step (S40) includes a hydroxyl group, and the hydroxyl group content is 0.5 mol % to 12.0 mol % based on the double bond content of a conjugated diene-based monomer unit.

According to an embodiment of the present invention, step (S10) may be a step for preparing an aromatic vinyl-based polymer forming an aromatic vinyl-based polymer block. In a particular embodiment, step (S10) may be performed by anionic polymerization by injecting an aromatic vinyl-based monomer in a hydrocarbon-based solvent in the presence of an organolithium compound.

According to an embodiment of the present invention, the hydrocarbon-based solvent may be any one which does not react with the organolithium compound and is used in common anionic polymerization reaction. Particular examples may include a linear or branched aliphatic hydrocarbon compound such as butane, n-pentane, n-hexane, n-heptane and iso-octane; a cyclic aliphatic hydrocarbon compound substituted or unsubstituted with an alkyl group such as cyclopentane, cyclohexane, cycloheptane, methylcyclohexane and methylcycloheptane; and an aromatic hydrocarbon compound substituted or unsubstituted with an alkyl group such as benzene, toluene, xylene and naphthalene, and any one among them, or a mixture of two or more thereof may be used.

In addition, according to an embodiment of the present invention, the organolithium compound is a polymerization initiator for initiating anionic polymerization reaction and may be one or more selected from the group consisting of n-butyl lithium, sec-butyl lithium, tert-butyl lithium, methyl lithium, ethyl lithium, isopropyl lithium, cyclohexyl lithium, allyl lithium, vinyl lithium, phenyl lithium and benzyl lithium.

According to an embodiment of the present invention, since step (S10) is performed by anionic polymerization reaction, the aromatic vinyl-based polymer prepared in step (S10) may be an anionic active aromatic vinyl-based polymer, particularly, may be obtained as a solution phase including an anionic active aromatic vinyl-based polymer.

According to an embodiment of the present invention, step (S20) may be a step for preparing a diblock copolymer by which a conjugated diene-based polymer block is formed in addition to the aromatic vinyl-based polymer block. In a particular embodiment, step (S20) may be performed by anionic polymerization by injecting a conjugated diene-based monomer in a solution phase including the anionic active aromatic vinyl-based polymer obtained in step (S10) in the presence of the anionic active aromatic vinyl-based polymer. Here, the anionic polymerization reaction of the conjugated diene-based monomer may be initiated from the anionic active aromatic vinyl-based polymer.

According to an embodiment of the present invention, since step (S20) is performed by anionic polymerization reaction, the diblock copolymer prepared in step (S20) may be an anionic active diblock copolymer, and particularly, may be obtained as a solution phase including the anionic active diblock copolymer.

According to an embodiment of the present invention, step (S30) may be performed by coupling reaction including injecting a coupling agent and reacting, in a solution phase including the anionic active diblock copolymer obtained in step (S20) in the presence of the anionic active diblock copolymer. Here, the coupling reaction on the coupling agent may be performed from the anionic active part of the anionic active diblock copolymer.

According to an embodiment of the present invention, since step (S30) is performed by the coupling reaction, the block copolymer prepared in step (S30) may be a triblock copolymer in which the diblock copolymer including the aromatic vinyl-based polymer block and the conjugated diene-based polymer block is connected by a coupling agent, particularly, may be obtained as a solution phase including a triblock copolymer, because the triblock copolymer is obtained by the coupling reaction by injecting a coupling agent in a solution phase including the anionic active diblock copolymer obtained in step (S20).

According to an embodiment of the present invention, step (S40) may be a step for preparing a block copolymer including a hydroxyl group by introducing a hydroxyl group into the triblock copolymer prepared in step (S30). In a particular embodiment, step (S40) may be a step for adding a hydroxyl group into a double bond included in the conjugated diene-based polymer block of the triblock copolymer, and the hydroxyl group may be added to the double bond included in the conjugated diene-based polymer block by a hydroboration and an oxidation reaction.

According to an embodiment of the present invention, the conjugated diene-based polymer block of the block copolymer prepared in step (S40) may include a hydroxyl group, and the hydroxyl group content may be 0.5 mol % to 12.0 mol %, 1.0 mol % to 10.0 mol %, 1.0 mol % to 8.0 mol %, 1.0 mol % to 5.0 mol %, 1.5 mol % to 4.0 mol %, 1.5 mol % to 3.0 mol % or 1.5 mol % to 2.5 mol % based on the double bond content of the conjugated diene-based monomer unit.

According to an embodiment of the present invention, the hydroboration of step (S40) may be performed in the presence of a borane or an organoborane compound as a boron source, and in a particular embodiment, the boron source may be 9-borabicyclo[3,3,1]nonate (9-BBN), and in this case, improving effects of the reactivity of hydroboration may be achieved.

According to an embodiment of the present invention, in regard of the double bond of the conjugated diene-based monomer unit of the conjugated diene-based polymer block, in order to introduce the hydroxyl groups to the level desired in the present invention so as to achieve the hydroxyl group content of 0.5 mol % to 12.0 mol %, 1.0 mol % to 10.0 mol %, 1.0 mol % to 8.0 mol %, 1.0 mol % to 5.0 mol %, 1.5 mol % to 4.0 mol %, 1.5 mol % to 3.0 mol % or 1.5 mol % to 2.5 mol % based on the double bond content, the boron source may be injected in step (S40) in an amount from 0.1 mol to 20.0 mol, 0.1 mol to 15.0 mol, 0.1 mol to 10.0 mol, 0.1 mol to 8.0 mol, 0.1 mol to 5.0 mol, 0.1 mol to 3.0 mol, 0.5 mol to 3.0 mol, 0.3 mol to 1.8 mol, 0.3 mol to 0.9 mol, or 1.2 mol to 1.8 mol based on 100 mol of the conjugated diene-based polymer block. In another embodiment, the boron source may be injected in step (S40) in an amount from 0.5 parts by weight to 13.0 parts by weight, 1.0 part by weight to 11.0 parts by weight, 1.0 part by weight to 9.0 parts by weight, 1.0 part by weight to 7.0 parts by weight, 1.5 parts by weight to 5.0 parts by weight, 1.5 parts by weight to 4.2 parts by weight or 1.5 parts by weight to 2.5 parts by weight based on 100 parts by weight of the triblock copolymer.

According to an embodiment of the present invention, the oxidation reaction in step (S40) is for substituting the boron source added to the double bond by the hydroboration with a hydroxyl group, and may be performed in the presence of an alkali hydroxide and hydrogen peroxide. Here, the alkali hydroxide may be sodium hydroxide or potassium hydroxide.

The present invention provides an asphalt composition including the block copolymer and asphalt. In this case, the block copolymer may be included in 1 part by weight to 10 parts by weight, 3 parts by weight to 8 parts by weight, or 4 parts by weight to 6 parts by weight based on 100 parts by weight of the asphalt, and within this range, effects of excellent solubility of the block copolymer composition with respect to asphalt and excellent physical properties of the asphalt composition may be achieved.

According to an embodiment of the present invention, the asphalt composition may further include a crosslinking agent for crosslinking the asphalt composition. The crosslinking agent may be a sulfur compound containing sulfur or iron sulfate, particularly, a sulfur element (powder), and the crosslinking agent may be included in 0.05 wt % to 3 wt % based on the total amount of the asphalt composition. Within this range, suitable crosslinking reaction may be maintained, and effects of improving physical properties at a high temperature and elasticity and preventing gelation may be achieved.

In addition, according to an embodiment of the present invention, the asphalt may include asphaltene in 1 wt % to 40 wt %, or 5 wt % to 30 wt % based on the total weight of the asphalt.

In addition, according to an embodiment of the present invention, the asphalt composition may be a material for paving a road or a building material such as a waterproof material.

Hereinafter, embodiments of the present invention will be explained in detail so that a person skilled in the art could easily perform the present invention. However, the present invention may be accomplished in various other types and is not limited to the embodiments explained herein.

EXAMPLES

Example 1

<Preparation of Triblock Copolymer>

To a nitrogen-substituted, 10 L reactor, 4,287 g of cyclohexane and 273 g of styrene were injected, and the temperature was raised to 60° C., while stirring. At a point where the temperature of the reactor reached 60° C., 1.091 g of n-butyl lithium was injected and reacted to polymerize a styrene polymer block.

Then, after finishing the reaction with heating of the styrene polymer block, and after 5 minutes, 607 g of 1,3-butadiene was injected and polymerized until 1,3-butadiene was completely consumed to prepare a styrene-butadiene diblock copolymer.

After finishing the reaction with heating of the diblock copolymer, and after 3 minutes, 1.1 g of dichlorodimethylsilane was injected as a coupling agent, and coupling reaction was performed for 5 minutes. An organic acid was injected to terminate the reaction, and an antioxidant was injected to prepare a triblock copolymer. A solution including the triblock copolymer was stripped and dried to obtain a triblock copolymer.

<Hydroboration and Oxidation Reaction>

To a nitrogen-substituted, 10 L, high-pressure reactor, 1,000 ml of tetrahydrofuran (THF) was injected, and 100 g of the triblock copolymer thus obtained was injected and dissolved. After finishing dissolution, 2.1 g of 9-borabicyclo[3,3,1]nonate (9-BBN) was injected and reacted at room temperature (23±3° C.) for 1 hour. After that, 10 ml of methanol was injected, and hydroboration was finished. Then, for the oxidation reaction, 10 ml (6 N) of $NaOH/H_2O_2$ was slowly injected into the reactor for 5 minutes under conditions of −10° C., then, the temperature was raised to 50° C., and reaction was performed for 1 hour. After that, $H_2O_2$ was precipitated and washed with methanol, and a solution including a block copolymer was dried to prepare a block copolymer pellet.

Example 2

The same method as in Example 1 was performed except for injecting 4.2 g of 9-borabicyclo[3,3,1]nonate (9-BBN) instead of 2.1 g during the hydroboration and oxidation reaction, in Example 1.

Example 3

The same method as in Example 1 was performed except for injecting 8.7 g of 9-borabicyclo[3,3,1]nonate (9-BBN) instead of 2.1 g during the hydroboration and oxidation reaction, in Example 1.

Comparative Example 1

The same method as in Example 1 was performed except for preparing a block copolymer pellet from a triblock copolymer without performing the hydroboration and oxidation reaction, in Example 1.

Comparative Example 2

The same method as in Example 1 was performed except for injecting 0.2 g of 9-borabicyclo[3,3,1]nonate (9-BBN) instead of 2.1 g during the hydroboration and oxidation reaction, in Example 1.

Comparative Example 3

The same method as in Example 1 was performed except for injecting 15.0 g of 9-borabicyclo[3,3,1]nonate (9-BBN) instead of 2.1 g during the hydroboration and oxidation reaction, in Example 1.

Experimental Examples

Experimental Example 1

In order to measure the hydroxyl group content with respect to each of the block copolymers prepared in Examples 1 to 3 and Comparative Examples 1 to 3, a specimen was collected and dissolved in $CDCl_3$ which is a solvent for NMR measurement, and $^1H$ NMR was measured using 500 MHz NMR of Varian Co. The hydroxyl group content in contrast to the double bond content in the block copolymer was calculated and shown in Table 1.

TABLE 1

| Division | Example | | | Comparative Example | | |
|---|---|---|---|---|---|---|
| | 1 | 2 | 3 | 1 | 2 | 3 |
| Hydroxyl group content (mol %) | 2.0 | 3.0 | 10.0 | 0.0 | 0.2 | 14.0 |

Experimental Example 2

At 180° C., 4.5 parts by weight of each of the block copolymer pellets prepared in Examples 1 to 3 and Comparative Examples 1 to 3 was calculated based on 600 g of asphalt (SK AP-5) as 100 parts by weight, and injected, and then, mixed at 3,000 rpm for 1 hour and 30 minutes using a high shear mixer (HSM) and stirred at 300 rpm using a low shear mixer (LSM). With the injection point of the block copolymer pellet as an initiation point, an unvulcanized asphalt composition was prepared while sampling a sample for confirming a softening point and phase separation every hour for 4 hours, and dissolution time and ductility when it was been four hours were measured and shown in Table 2 below.

In addition, at 180° C., 4.5 parts by weight of each of the block copolymer pellets prepared in Examples 1 to 3 and Comparative Examples 1 to 3 was calculated based on 600 g of asphalt (SK AP-5) as 100 parts by weight, and injected, and then, mixed at 3,000 rpm for 30 minutes using a high shear mixer (HSM). Then, 0.1 parts by weight of a sulfur powder was injected, and after 1 hour and 30 minutes from the injection point of the block copolymer pellet as an initiation point, stirring using a low shear mixer (LSM) was performed at 300 rpm for 1 hour and 30 minutes to prepare a vulcanized asphalt composition. The softening point, viscosity and recovery rate of the vulcanized asphalt composition thus prepared was measured and shown in Table 2 below.

Dissolution time (hr): 50 g of the unvulcanized asphalt composition prepared was weighed hourly in an aluminum tube and aged in an oven of 180° C. for 72 hours, and the temperature of phase separation was measured. In this case, the low temperature of phase separation meant high solubility, and the temperature of 3° C. or less meant a dissolution completed state. From these results, the time of a sample showing the temperature of phase separation of 3° C. or less was regarded as the dissolution time.

Ductility (mm, at 15° C.): The unvulcanized asphalt composition prepared was stretched in a rate of 5 cm/min in a thermostat keeping a temperature of 15° C., based on ASTM D113, and a length where a corresponding sample was broken was measured.

Softening point (° C.): A specimen was prepared from the vulcanized asphalt composition prepared, and based on ASTM D36, the specimen thus prepared was softened through heating water or glycerin by 5° C. per 1 minute, and the temperature where a bead having a diameter of 9.525 mm and a weight of 3.5 g and positioned on the specimen was drooped by 1 inch was measured. The high softening point means excellent physical properties of the asphalt composition.

Viscosity (cps): After low shear mixing during preparing the vulcanized asphalt composition, the viscosity at 135° C. was measured using a Brook Field Viscometer. The viscosity at 135° C. tended to consistently increase during storing the asphalt composition thus prepared, and a viscosity of 3,000 cps or less is preferable considering processability. If the viscosity is greater than 4,000 cps, it is unusable.

Recovery rate (%): A specimen was prepared from the vulcanized asphalt composition prepared, and the specimen was stretched at both ends at a temperature of 25° C. in a rate of 5 cm/min, kept for 5 minutes, cut in the middle, and stored at a temperature of 25° C. for 1 hour. The two of cut specimens were connected, and the ratio of a length recovered against a stretched length was measured to measure the recovery rate.

TABLE 2

|  | Division |  | Example 1 | Example 2 | Example 3 | Comparative Example 1 | Comparative Example 2 | Comparative Example 3 |
|---|---|---|---|---|---|---|---|---|
| Unvul- canized | Dissolu- tion time | hr | 3.0 | <2.0 | <2.0 | 7.5 | 7.0 | <2.0 |
|  | 15° C. ductility | mm | 1,036 | 1,107 | 1,023 | 824 | 912 | 715 |
| Vulcan- ized | Softening point | ° C. | 88.4 | 88.3 | 87.7 | 82.8 | 83.1 | 89.5 |
|  | 135° C. viscosity | cps | 2,800 | 3,135 | 3,360 | 2,250 | 2,305 | 5,035 |
|  | Recovery rate | % | 93.5 | 93.5 | 93.5 | 94.5 | 94.0 | 93.0 |

As shown in Table 2, in cases of Examples 1 to 3, in which hydroxyl groups were introduced into the conjugated diene-based polymer blocks of the block copolymers according to the present invention, it could be confirmed that the dissolution times were markedly reduced, compatibility with asphalt was excellent, the softening points were high, and mechanical properties were excellent. Among them, from Examples 1 and 2, in which 2 mol % and 3 mol % of the hydroxyl groups were introduced, it could be confirmed that the dissolution times were reduced, and the rapid increase of the viscosity was prevented by introducing a suitable amount of hydroxyl groups. Particularly, Example 1, having the viscosity at 135° C. of 3,000 cps or less showed a suitable level of the dissolution time, and it could be confirmed that compatibility with respect to asphalt could be sufficiently secured, the softening point and mechanical properties were excellent, and processability was most excellent.

On the contrary, in case of Comparative Example 1, in which the hydroxyl group was not introduced, it could be confirmed that the dissolution time was very long, and compatibility with respect to asphalt was inferior. Also, it could be confirmed that the softening point was low, and physical properties at a high temperature were inferior.

In addition, in case of Comparative Example 2, in which though introducing a hydroxyl group, but only 0.2 mol % was introduced, it could be confirmed that the improvement of physical properties was extremely insignificant when compared to Comparative Example 1 in which the hydroxyl group was not introduced. And in case of Comparative Example 3 in which 14 mol % was introduced, the polar group content in a block copolymer was high, the dissolution time was short, and the softening point was increased, but due to the rapid increase of the viscosity, it could be confirmed that processing was impossible, and the use as an asphalt modifier was impossible.

The invention claimed is:

1. A block copolymer comprising an aromatic vinyl-based polymer block, a conjugated diene-based polymer block and a coupling agent linking group,
   wherein the conjugated diene-based polymer block comprises a hydroxyl group, and
   the hydroxyl group content is 0.5 mol % to 12.0 mol % based on the double bond content of a conjugated diene-based monomer unit.

2. The block copolymer according to claim 1, wherein the hydroxyl group content is 1.0 mol % to 8.0 mol % based on the double bond content of the conjugated diene-based monomer unit.

3. The block copolymer according to claim 1, wherein the hydroxyl group content is 1.5 mol % to 3 mol % based on the double bond content of the conjugated diene-based monomer unit.

4. The block copolymer according to claim 1, wherein the coupling agent linking group is one or more coupling agent linking groups selected from the group consisting of a vinyl group-containing hydrocarbon-based compound; an ester-based compound; a silane-based compound; a polysiloxane-based compound; and a polyketone.

5. A method for preparing a block copolymer, the method comprising:
   injecting an aromatic vinyl-based monomer and polymerizing in the presence of an organolithium compound to prepare an anionic active aromatic vinyl-based polymer (S10);
   injecting a conjugated diene-based monomer and polymerizing in the presence of the anionic active aromatic vinyl-based polymer prepared in step (S10) to prepare an anionic active diblock copolymer (S20);
   injecting a coupling agent and reacting in the presence of the anionic active diblock copolymer prepared in step (S20) to prepare a triblock copolymer (S30); and
   performing a hydroboration and an oxidation reaction in the presence of the triblock copolymer prepared in step (S30) to prepare a block copolymer (S40),
   wherein the block copolymer prepared in step (S40) comprises a conjugated diene-based polymer block comprising a hydroxyl group, and
   the hydroxyl group content is 0.5 mol % to 12.0 mol % based on the double bond content of a conjugated diene-based monomer unit.

6. The method for preparing a block copolymer according to claim 5, wherein the hydroboration is performed in the presence of a borane or an organoborane compound as a boron source in step (S40).

7. The method for preparing a block copolymer according to claim 6, wherein the boron source is 9-borabicyclo[3,3,1]nonate (9-BBN).

8. The method for preparing a block copolymer according to claim 5, wherein a boron source is injected in an amount from 0.1 mol to 20.0 mol based on 100 mol of the conjugated diene-based polymer block in step (S40).

9. The method for preparing a block copolymer according to claim 5, wherein a boron source is injected in an amount from 0.5 parts by weight to 13.0 parts by weight based on 100 parts by weight of the triblock copolymer in step (S40).

10. The method for preparing a block copolymer according to claim 5, wherein the oxidation reaction is performed in the presence of an alkali hydroxide and hydrogen peroxide in step (S40).

11. An asphalt composition comprising the block copolymer according to claim 1, and asphalt.

* * * * *